US010638568B2

(12) United States Patent
Niedermeier et al.

(10) Patent No.: US 10,638,568 B2
(45) Date of Patent: Apr. 28, 2020

(54) HEADLAMP HAVING A CIRCUIT ASSEMBLY FOR SIMULATING A LOAD CURRENT FROM A VEHICLE ELECTRICAL SYSTEM

(71) Applicant: OSRAM GmbH, Munich (DE)

(72) Inventors: Peter Niedermeier, Munich (DE); Marc Schwenkbeck, Winnenden (DE)

(73) Assignee: OSRAM BETEILIGUNGSVERWALTUNG GMBH, Grunwald (DE)

( * ) Notice: Subject to any disclaimer, the term of this patent is extended or adjusted under 35 U.S.C. 154(b) by 0 days.

(21) Appl. No.: 16/098,149

(22) PCT Filed: May 4, 2017

(86) PCT No.: PCT/EP2017/060685
§ 371 (c)(1),
(2) Date: Nov. 1, 2018

(87) PCT Pub. No.: WO2017/191270
PCT Pub. Date: Nov. 9, 2017

(65) Prior Publication Data
US 2019/0150236 A1   May 16, 2019

(30) Foreign Application Priority Data

May 6, 2016 (DE) .................. 10 2016 207 823

(51) Int. Cl.
*B60Q 1/00* (2006.01)
*H05B 33/08* (2020.01)
(Continued)

(52) U.S. Cl.
CPC ............. *H05B 33/089* (2013.01); *B60Q 1/04* (2013.01); *B60Q 11/00* (2013.01); *F21S 41/141* (2018.01);
(Continued)

(58) Field of Classification Search
CPC ........ B60Q 1/04; B60Q 1/2696; B60Q 3/745; B60Q 2400/20; B60Q 2900/10; F21S 41/141; F21S 41/172; H05B 33/089
See application file for complete search history.

(56) References Cited

U.S. PATENT DOCUMENTS 8,159,144 B2 *   4/2012   Behr .................... B60Q 1/0023
                                                    315/158
8,598,735 B2 * 12/2013   Schnerr .................... B60Q 1/00
                                                    307/10.1
(Continued)

FOREIGN PATENT DOCUMENTS

DE           10215486 C1   10/2003
DE   10 2007 043 412 A1    4/2009
(Continued)

OTHER PUBLICATIONS

German Search Report based on application No. 10 2016 207 823.2 (9 pages) dated Feb. 3, 2017 (for reference purpose only).
(Continued)

*Primary Examiner* — Alexander H Taningco
*Assistant Examiner* — Kurtis R Bahr
(74) *Attorney, Agent, or Firm* — Viering, Jentschura & Partner MBB

(57) ABSTRACT

A headlamp for the conversion of an original headlamp of a vehicle, comprising: an input for each light function provided by the headlamp, wherein the input is configured to connect to a line of the on-board network of a vehicle for the associated light function, an output for connecting to an on-board network of the vehicle, a module for simulating a load current for those light functions that require considerably less power in the headlamp than the corresponding light source in the original headlamp, at least one light source with an associated electronic operating device for each light function of the headlamp, and a controller for controlling-
(Continued)

the modules for simulating a load current and for controlling the light sources with the associated electronic operating device. The module for simulating a load current for each light source comprises a series circuit arrangement of a resistor and a switch.

13 Claims, 4 Drawing Sheets

(51) Int. Cl.
*B60Q 11/00* (2006.01)
*F21S 41/172* (2018.01)
*F21S 41/141* (2018.01)
*B60Q 1/04* (2006.01)

(52) U.S. Cl.
CPC ........ *F21S 41/172* (2018.01); *B60Q 2900/10* (2013.01); *Y02B 20/383* (2013.01)

(56) References Cited

U.S. PATENT DOCUMENTS

| | | | | |
|---|---|---|---|---|
| 9,101,031 | B2* | 8/2015 | Tanaka | H05B 33/0815 |
| 9,374,862 | B2* | 6/2016 | Huang | H05B 33/0821 |
| 2002/0033702 | A1* | 3/2002 | St-German | B61L 5/1881 |
| | | | | 324/550 |
| 2003/0063477 | A1* | 4/2003 | Stepanenko | B29C 45/14811 |
| | | | | 362/546 |
| 2011/0062869 | A1* | 3/2011 | Hsu | B60Q 11/005 |
| | | | | 315/77 |
| 2014/0029285 | A1 | 1/2014 | Bittinger et al. | |
| 2014/0252950 | A1* | 9/2014 | Kikuchi | H05B 33/0815 |
| | | | | 315/77 |
| 2015/0179422 | A1* | 6/2015 | Nakazato | H01J 61/125 |
| | | | | 313/112 |
| 2015/0321598 | A1* | 11/2015 | Kanayama | F21S 41/19 |
| | | | | 362/487 |

FOREIGN PATENT DOCUMENTS

| | | | |
|---|---|---|---|
| DE | 10 2008 048 197 | A1 | 3/2010 |
| DE | M 2010 015 919 | U1 | 3/2011 |
| DE | 10 2009 052 690 | B3 | 4/2011 |
| DE | 10 2011 007 123 | A1 | 10/2012 |
| DE | 10 2013 003 765 | A1 | 2/2014 |
| EP | 2648481 | A1 | 10/2013 |

OTHER PUBLICATIONS

International Search Report based on application No. PCT/EP2017/060685 (5 pages + 3 pages English translation) dated Jul. 7, 2017 for (reference purpose only).

International Search Report issued for corresponding CN Application No. CN201780027835, dated Jan. 12, 2020, 2 pages (for informational purpose only).

\* cited by examiner

HEADLAMP HAVING A CIRCUIT ASSEMBLY FOR SIMULATING A LOAD CURRENT FROM A VEHICLE ELECTRICAL SYSTEM

CROSS-REFERENCE TO RELATED APPLICATION

The present application is a national stage entry according to 35 U.S.C. § 371 of PCT application No.: PCT/EP2017/060685 filed on May 4, 2017, which claims priority from German Patent Application Serial No.: 10 2016 207 823.2 which was filed May 6, 2016, and is incorporated herein by reference in its entirety and for all purposes.

TECHNICAL FIELD

The description relates to a headlamp and to a circuit assembly for simulating a load current from an on-board network, including an input for each light function provided by the headlamp, which input is designed for connecting to a line of the vehicle for the associated light function, an output, which is designed for connecting to an on-board network of the vehicle, a module for simulating a load current for those light functions that require considerably less power in the headlamp than the corresponding light source in the original headlamp, at least one light source with an associated electronic operating device for each light function of the headlamp, and a controller for controlling the modules for simulating a load current and for controlling the light sources with the associated electronic operating device.

BACKGROUND

The description proceeds from a headlamp and a circuit assembly for simulating a load current from an on-board network, of the generic type disclosed in the main claim.

In recent times, LED-based retrofit lamps have conquered extensive areas of the lighting technology sector, particularly in the field of general lighting. However, retrofit lamps are also increasingly to be found in the automobile industry, where they are intended to, and are capable of replacing the filament lamps employed in this sector. These retrofit lamps have two major advantages: firstly, they are significantly superior to related filament lamp-based items, in terms of energy saving. Secondly, they have a significantly longer service life than the original lamps. Specifically, however, the first advantage results in practical problems in an automobile context, as state-of-the-art vehicles incorporate a monitoring function for filament lamps. This customarily monitors two factors: firstly, with the light in the switched-off state, the resistance of the filament is measured, and it is thus established whether the filament lamp is still functional. Moreover, with the corresponding lamp in service, the current in the lamp is measured. If the resistance exceeds a reference value, or if the current is lower than a reference value, the corresponding line is switched-out, and the on-board computer notifies the driver that the lamp concerned is defective and requires replacement.

Accordingly, the simple replacement of a filament lamp with a retrofit lamp in vehicles of this type is not possible. In headlamps in particular, lamps for key light functions such as dipped beam lighting and main beam lighting are standardized, wherein the associated standard is tailored to filament lamps. This means that LED retrofit lamps cannot be employed in this context, as the headlamp would otherwise lose its approved status.

In order to resolve this problem, replacement headlamps are known, in which standardized light functions are delivered by means of permanently-installed LED lamps or HID lamps. However, even in low-energy replacement headlamps, the problem with the on-board computer remains.

SUMMARY

The description describes a headlamp for the conversion of an original headlamp on a vehicle, which permits the use of state-of-the-art lighting means in an automobile, in place of filament lamps.

According to the description, this object may be fulfilled by a headlamp for the conversion of an original headlamp of a vehicle, including an input for each light function provided by the headlamp, which input is designed for connecting to a line of the vehicle for the associated light function, an output designed for connecting to an on-board network of the vehicle, a module for simulating a load current for those light functions that require considerably less power in the headlamp than the corresponding light source in the original headlamp, at least one light source with an associated electronic operating device for each light function of the headlamp, and a controller for controlling the modules for simulating a load current and for controlling the light sources with the associated electronic operating device. By this arrangement, the retrofit headlamp may be fitted in place of an original headlamp with virtually no additional complexity. Only a single line to the on-board network, e.g. on terminal 30, is required. This arrangement advantageously saves installation time, and consequently costs.

It may be advantageous that the headlamp includes a module for simulating a load current, having an input which is designed for connecting to a line of a light function, and an output for connecting to a light source which replaces the load, wherein the light source has a lower current consumption than the load which is to be replaced, and additionally a series circuit comprised of a resistor and a switch, wherein the resistor is rated to a comparable order of magnitude to the resistance of the load to be simulated, and the series circuit is connected in parallel with the input, and a switching controller, the input is connected in parallel with the input of the module for simulating a load current, and which draws a current from the line of the light function which is smaller than the load current of the load to be replaced, wherein the module is designed, upon the activation of the load, to open the switch and actuate the switching controller and, upon the disconnection of the load, to close the switch and deactivate the switching controller, wherein an output of the switching controller feeds the load current drawn back into the on-board network of the vehicle. By the advantageous configuration of the module, simulation of the load current is exceptionally secure and reliable, and the expenditure associated with the production of the module is manageable.

In one form of a non-limiting embodiment, the load of the light function is a filament lamp. This is normal for the majority of headlamps.

In a non-limiting embodiment of the headlamp, the light source is an LED or an LED module having an associated electronic operating device. This arrangement may provide an exceptionally energy-saving and long-lasting headlamp.

In another non-limiting embodiment, the light source is a HID lamp having an associated electronic operating device. HID lamps are still in widespread use for dipped beam and main beam light functions, and advantageously deliver more light, with a consequent improvement in safety.

In another non-limiting embodiment, the light source is an LED retrofit lamp. Retrofit lamps provide an advantageously effective compromise between cost and benefit, particularly for simpler light functions such as side lights and indicator lights. Where retrofit lamps are employed, it is not necessary for the headlamp to be converted, but this light function may be assumed in virtually its original form.

In a further non-limiting embodiment, the switching controller is a step-up converter. A step-up converter is easy to produce, and is capable of injecting the load current drawn back into the on-board network.

In a non-limiting embodiment, the electronic operating device for the HID lamp includes an input for the switchover between a dipped beam light function and a main beam light function, which is connected to the controller. Accordingly, the controller may then advantageously switch over the respective light function between dipped beam lighting and main beam lighting, as required.

In the event of a defect in the light source, the switching controller continues to remain disconnected, and the switch continues to remain open. By this arrangement, in the event of a defect in the light source, the failure of the filament in the filament lamp which is to be replaced is simulated, and the on-board computer of the vehicle correctly notifies the driver of a defective light source.

In a further non-limiting embodiment, a driver circuit is provided, which draws a light source operating current for one or more light functions from the on-board network, and the module for simulating a load current for the relevant light function draws the rated load current for the load of the light function which is to be replaced. By this arrangement, advantageously, any overloading of the dipped beam light function may be prevented, if a HID lamp is employed, the start-up of which draws power in excess of the nominal capacity of the filament lamp which is to be replaced. As a result of the direct take-up of the start-up current from the on-board network and the simulation of the dipped beam light function, no error is notified by the on-board computer.

Further advantageous further developments and configurations of the headlamp according to the invention for the conversion of an original headlamp and the circuit assembly according to the invention for simulating a load current proceed from the following description.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DETAILED DESCRIPTION

Figure 1:
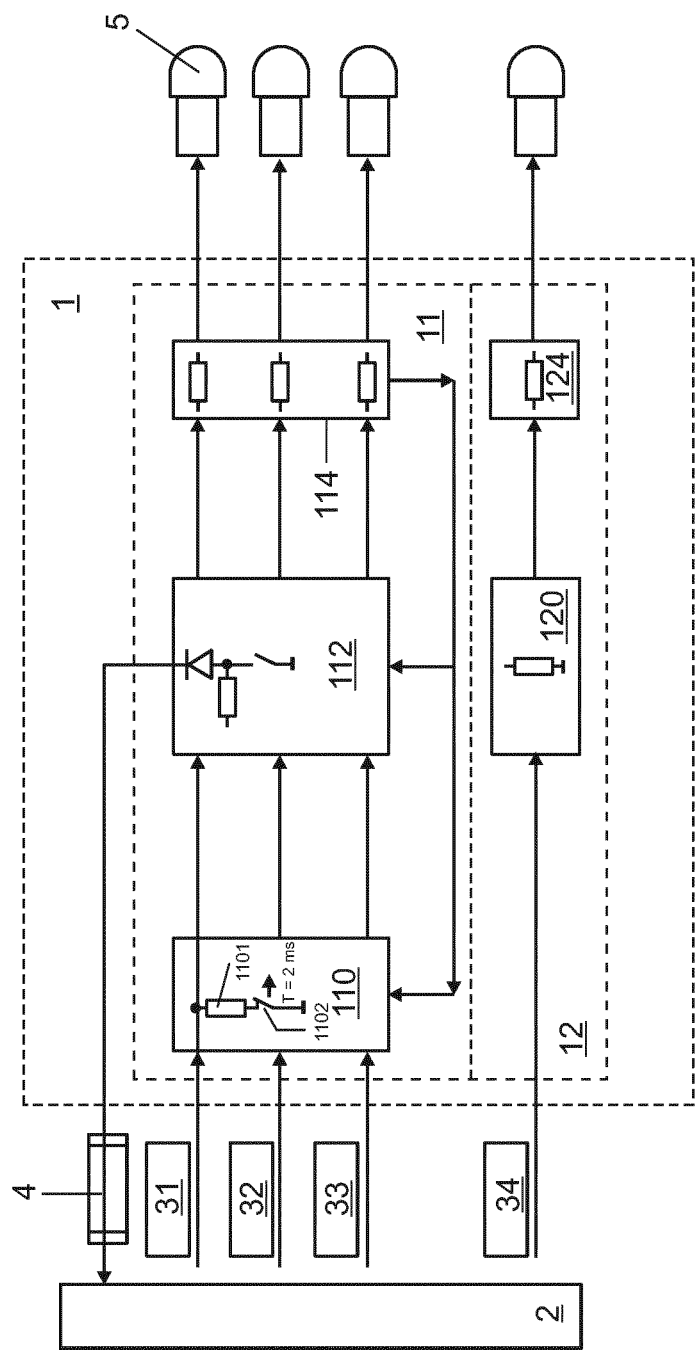
FIG. 1 shows a schematic representation of a complete module for a vehicle in a first form of embodiment, which delivers a load current simulation for the key functions involving operation with retrofit lamps.

FIG. 1 shows a schematic representation of a complete module 1 for a vehicle, which delivers a load simulation for key functions. The complete module 1 is comprised of various individual modules. However, the complete module may also be configured as an individual module, which incorporates all functions. In the present case, the complete module 1 is comprised of a load module 11 and a resistance module 12.

The function of load modules is, by way of non-limiting example, the simulation of the load current for large loads, such as headlamps or indicator lamps.

The function of resistance modules, by way of non-limiting example, is the simulation of the load current for small loads, such as e.g. license plate lights.

These two types of modules operate differently.

The load modules 11 include a cold lamp monitor 110, an electronic load 112 and an LED retrofit lamp monitor 114. The function of the cold lamp monitor 110 is to simulate a cold lamp in the switched-off state. The electronic load 112 generates a load current on the feeder line of the load to be replaced. By means of an electronic converter, this load current is fed back into the on-board network 2 at another point, such that the monitoring module of the vehicle only measures the load current on the line. During this check, the LED retrofit lamp is not switched on. This is either executed by means of a soft start function, wherein the LED retrofit lamp is only switched on after a few ms, or the cold lamp monitor 110 detects the execution of a cold lamp test on the monitoring module, and leaves the LED retrofit lamp switched off, thereby preventing any flash illumination of the latter during the cold lamp test. Finally, the LED retrofit lamp monitor 114 monitors the current in the LED retrofit lamp in the switched-on state, thereby confirming the operation thereof.

The resistance modules 12 are of substantially simpler design, and are consequently ideal for smaller loads, such as license plate lighting or interior lighting. The resistance module 12 includes a resistance load 120 and likewise an LED retrofit lamp monitor 124.

Figure 2:
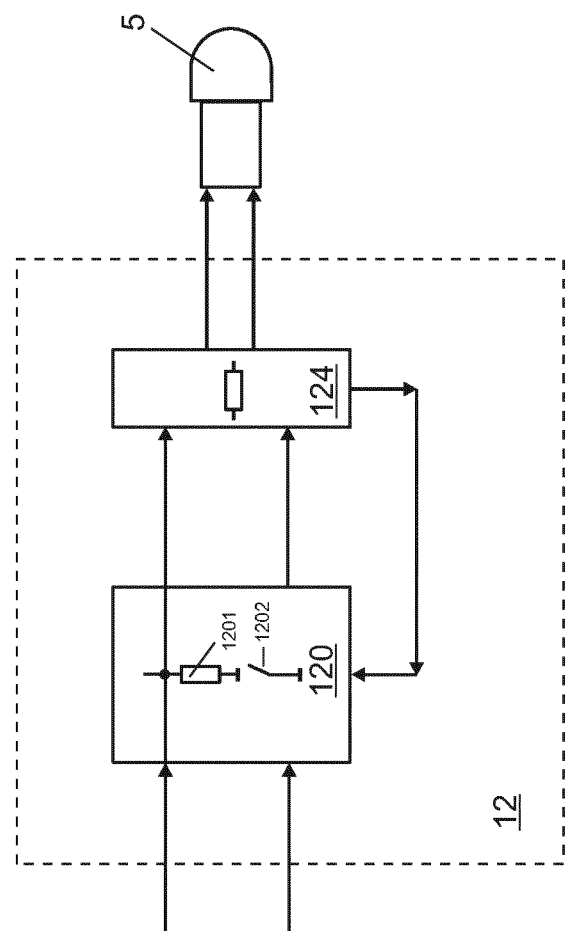
FIG. 2 shows a schematic representation of a resistance module for a vehicle, which delivers a load current simulation for one or more functions involving operation with retrofit lamps.

FIG. 2 shows a schematic representation of a resistance module for a vehicle, which delivers a load current simulation for a function 34. The resistance module 12 is of comparatively simple design, and is suitable for small loads such as interior lighting or license plate lighting. The resistance module 12 includes a combined cold lamp monitoring and load module 120, and an LED retrofit lamp monitor 124. In the resistance module, current which is to be drawn from the line is simply consumed in a load resistor 1201. The load resistor 1201 forms part of the combined cold lamp monitoring and load module 120, and must be rated such that it generates a current which is smaller than the rated current of the filament lamp to be replaced by at least the rated current of the retrofit lamp employed. Accordingly, the overall current will be of equal magnitude to the rated current of the filament lamp to be replaced.

The load resistor 1201 is connected in parallel with the input of the resistance module 12. In series with the load resistor 1201, a switch 1202 is further arranged, which is normally closed. Accordingly, the series circuit comprised of the load resistor 1201 and the switch 1202 is interconnected in the same way as the filament of the filament lamp to be replaced. This has two advantages: firstly, with the switch 1202 closed, the load resistor 1201 simulates the filament resistance of the filament of the filament lamp. As the load resistor 1201 generates a current which approximately corresponds to the rated current of the filament lamp, its resistance also lies within the range of the filament resistance of the filament lamp to be replaced. As a result, the load resistor simulates the filament resistance of the filament lamp, and the monitoring function in the vehicle detects the presence of a normally functioning filament lamp.

The resistance module 12 further includes an LED retrofit lamp monitor 124, which monitors the operation of the LED retrofit lamp 5, e.g. with reference to the current consumption of the lamp. If the lamp fails and is no longer functional, the LED retrofit lamp monitor 124 opens the switch 1202. The current circuit of the load resistor 1202 is thus interrupted such that, firstly, a filament failure in the filament lamp is simulated, as the resistance may no longer be measured and, secondly, no load current flows in an active current circuit, which likewise corresponds to the behavior of a filament lamp with a failed filament.

In consequence, the monitoring function of the vehicle detects a defective filament lamp, if the LED retrofit lamp 5 is defective. This corresponds to the desired behavior of the assembly.

Figure 3:
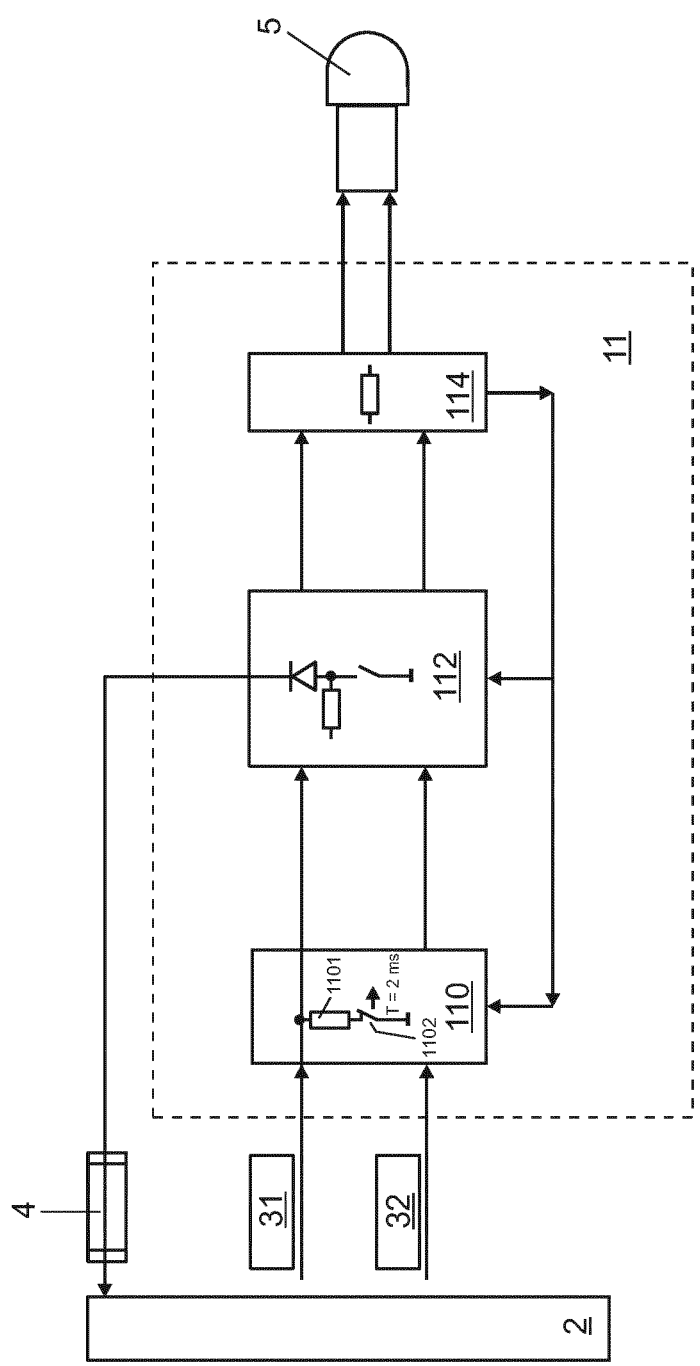
FIG. 3 shows a schematic representation of a load module for a vehicle, which delivers a load current simulation for a function involving operation with retrofit lamps.

FIG. 3 shows a schematic representation of a load module 11 for a vehicle, which delivers a load current simulation for a function 31 and for a function 32. The load module 11 is capable of feeding the simulated load current $i_L$ back into the on-board network 2 via a fuse 4, and is therefore particularly appropriate for light functions involving a high current consumption, such as headlamps or similar. In a cold lamp monitoring circuit 110, the load module 11 includes a resistor 1101 for filament simulation, and a switch 1102 connected in series with the resistor. The series circuit of the resistor 1101 and the switch 1102 is connected in parallel with the input of the load module 11, and consequently at the same point where the filament lamp to be replaced would be connected. The switch is normally closed, such that the resistor may simulate the filament resistance of the filament of the filament lamp which is to be replaced. To this end, the resistor 11 has a similar resistance rating to the cold resistance of the filament of the filament lamp which is to be replaced. The load module 11 further includes an LED retrofit lamp monitor 114 which, e.g. on the basis of the current in the switched-on state, monitors the operation of the retrofit lamp. If the LED retrofit lamp 5 is defective, the LED retrofit lamp monitor 114 then opens the switch 1102, and thus simulates a failed filament in the filament lamp which is to be replaced.

The load module 11 further includes an electronic load 112. The electronic load 112 may be a DC voltage converter such as, e.g. a step-up converter or a flyback converter. The input of the electronic load 112 is connected in parallel with the input of the load module 11. The output of the electronic load 112 is connected to the on-board network 2. For the purposes of safety, a further fuse 4 is arranged between the on-board network 2 and the electronic load 112. The electronic load 112 thus generates a load current on the line to which the filament lamp which is to be replaced is normally connected. The load current may correspond to the load current of the filament lamp which is to be replaced, minus the current of the retrofit lamp. The total current thus corresponds exactly to the current of the filament lamp which is to be replaced. The infeed to the on-board network of the vehicle must proceed at a location which is not monitored by the monitoring function of the vehicle. Accordingly, the monitoring function of the vehicle does not detect the current injected, and only measures the current drawn on the relevant line for the filament lamp. During the correct operation of the LED retrofit lamp 5, the monitoring function of the vehicle thus detects no error. By the feedback of power to the on-board system, this solution is highly energy-efficient, as losses are limited to conversion losses on the electronic load 112, which are very low. It is important that, upon the switch-on of the function, the electronic load 112 is switched on, and the switch 1102 of the cold lamp monitor 110 is simultaneously open, as an excessively high load current and unwanted current consumption in the load resistor 1101 would otherwise occur. In this case, the function of the load resistor is thus restricted to the simulation of the cold filament in the lamp which is to be replaced, rather than the consumption of the load current, which is executed by means of the electronic load 112.

If the LED retrofit lamp monitor 114 detects a defective LED retrofit lamp 5, it switches off the converter. Where the switch 1101 is simultaneously open, current consumption is reduced to virtually zero, and the monitoring function of the vehicle detects and indicates a defective filament lamp, as required.

Figure 4:
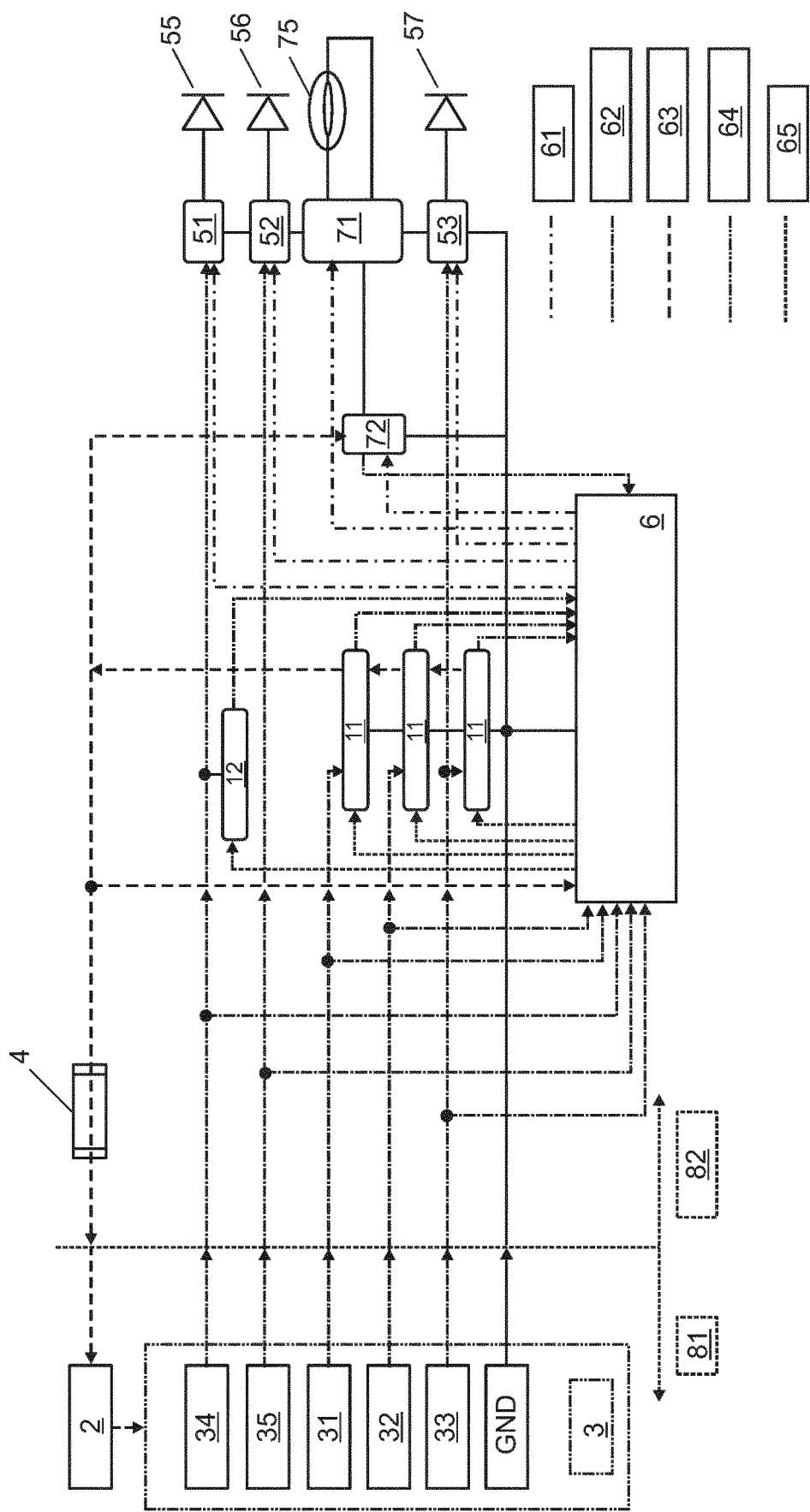
FIG. 4 shows a schematic representation of a complete module in a second form of embodiment, in the form of a front headlight having a high-pressure xenon discharge lamp as the headlamp, and LEDs for the remaining light functions.

FIG. 4 shows a schematic representation of a complete module in a second form of embodiment, in the form of a front headlight 82 having a high-pressure xenon discharge lamp 75 as the headlamp, and LEDs 55, 56, 57 for the remaining light functions. The front headlight 82 is a retrofit headlight for an original headlight in a vehicle 81, having energy-saving light functions. By the replacement of a complete headlight, rather than the replacement of individual lamps, the fitting of energy-saving long-life light functions is substantially easier for the user, and may be offered more cost-effectively by a workshop, in the light of the substantial time saving in replacement operations.

The headlight 82 delivers light functions for dipped beam lighting 32, main beam lighting 31, daytime running lighting 35, side lighting 34 and indicator lighting 33, which are monitored by an on-board computer 6 via the lines 62. In the original headlamps of budget vehicles, functions for dipped beam lighting, main beam lighting, side lighting and indicator lighting are customarily provided by filament lamps. Today, the daytime running light function, even in the original headlamps of low-cost vehicles, is already provided by means of LEDs.

For high-power light functions, namely dipped beam lighting, main beam lighting and indicator lighting, load modules 11 are provided which, as described above, incorporate a load current simulation function and a filament simulation function. The load modules 11 are actuated via the lines 65, by means of a central controller 6 which is incorporated in the headlamp. The load modules feedback information on the simulated load current to the controller 6 via the lines 64. In general, load modules are provided, if new light functions using state-of-the-art lighting means require significantly less power than the original filament lamps employed. This applies particularly to high-power light functions, such as dipped beam lighting, main beam lighting and indicator lighting. Low-power light functions, such as side lighting, which are customarily executed using a 5 W bulb, are then delivered using a resistance module 12. As a distinguishing criterion as to whether a load module 11 or a resistance module 12 is to be employed, the cost-benefit ratio is routinely considered. Naturally, in the case of light functions which, even in original headlights, already employ state-of-the-art lighting means, neither a load module 11 nor a resistance module 12 is required. In this case, as a decision-making criterion, a circumstance is required in which the new light function consumes significantly less power than the original light function. In this case, significantly less power can be, for example, less than 50% of the original power. If the new light function requires, for example, only 10% less power, this will generally fall within the tolerance margin of the on-board computer, such that no load current simulation is necessary for this light function.

For the dipped beam and main beam light functions, the headlamp incorporates a high-pressure xenon discharge lamp 75. The high-pressure xenon discharge lamp 75 is operated by an electronic operating device 71. The switchover between the dipped beam and main beam light functions in the headlamp 82 is executed by a controller 6, via the control line 61. A driver circuit 72 is directly connected to the on-board network via the line 63. The driver circuit 72 supplies the electronic operating device 71, as the high-pressure xenon discharge lamp 75, during start-up, requires a very high current, which exceeds the current rating of the filament lamp which is to be replaced, and the on-board computer 3 would otherwise indicate an error, if the current for the electronic operating device were to be drawn directly from the line 62. For this reason, the load modules 11 for these two functions are also designed to simulate the full load current of the filament lamp which is to be replaced. These load modules are then naturally connected via the lines 62 to the corresponding light functions 31, 32 on the on-board computer 3. The load modules 11 feedback information on the current drawn to the controller 6 via the lines 64.

The driver circuit 72 likewise feeds back information on the current drawn by the high-pressure xenon discharge lamp 75 to the controller 6 via a line 64. The electronic operating device 71 is directly connected to the driver circuit 72, and draws its operating current via the latter. The controller 6 actuates the driver circuit 72 and the electronic operating device 71. The driver circuit 72 is configured for the switch-on and switch-off of the operating current for the electronic operating device 71, and the electronic operating device 71 is configured for the general switch-on and switch-off of the light function. If the high-pressure xenon discharge lamp 75 is defective, the controller 6 permanently switches off the electronic operating device 71 via the driver circuit 72, and switches the associated load module 11 for the simulation of a defective filament lamp (see above), such that the on-board computer 3 notifies an error to the driver. The full functionality of dipped beam and main beam light functions is maintained accordingly.

For the indicator light function, one or more LEDS 57 are provided in the headlamp, which are operated by an electronic operating device 53. The electronic operating device 53 draws its current via the indicator lighting function 33 of the on-board computer 3 via a line 62. For the indicator light function 33, a load module 11 is provided, which likewise draws the differential current between the filament lamp which is to be replaced and the LED 57 via the line 62, such that the current measurement system of the on-board computer 3 measures the correct current for this function. The load module feeds current back into the on-board network via a line 63, at a point which is not monitored by the on-board computer. The electronic control device 53 and the load module 11 are actuated by the controller 6. The load module is actuated via a control line 65, and the electronic operating device 53 is actuated via a control line 61. If the LED 57 fails, the electronic operating device 53 is permanently switched off and the load module is actuated such that it simulates a defective filament lamp. The on-board computer 3 thus correctly indicates a defective lamp to the driver.

For the daytime running light function 35, only an electronic operating device 52 is provided, and no load module, as this function is likewise executed in the original headlamp by LEDs, and the current consumption is thus identical. The electronic control device 52 is still actuated by the controller 6 via a control line 61. The controller 6 measures the current for the daytime running light function 35 via a measuring line 64. If an LED 56 for this light function is defective, the controller permanently switches off the electronic operating device 52, and the on-board computer 3 indicates the malfunction to the driver.

For the side light function, an LED 55 is provided in the headlight 82. The LED 55 is operated by an electronic operating device 51. The electronic operating device 51 draws its current via a line 62 from the side light function 34. A resistance module 12 is provided, which draws the differential current between the original filament lamp and the LED 55 from the line 62. Accordingly, for the on-board computer 3, the current consumption corresponds to that of an original filament lamp, and no error message is generated. The electronic operating device 51 is actuated by the controller 6 via a line 61. The resistance module is actuated by the controller 6 via a line 65. In the event of the failure of the LED 55, the controller 6 permanently switches off the electronic operating device 51, and actuates the resistance module 12 such that the latter simulates a defective filament lamp. The on-board computer thus correctly indicates a defective side light to the driver.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

LIST OF REFERENCE NUMBERS

1 Complete module
2 On-board network
3 Monitoring function in vehicle, on-board computer
4 Fuse
5 LED retrofit lamps
6 Controller
11 Load module
12 Resistance module
31 Main beam light function
32 Dipped beam light function
33 Indicator light function
34 Side light function
35 Daytime running light function
51 Driver for side light
52 Driver for daytime running light
53 Driver for indicator light
55 Side light LEDs
56 Daytime running light LEDs
57 Indicator light LEDS
61 Control line of electronic operating device
62 Current monitored by vehicle monitoring function
63 Direct connection to on-board network 2
64 Current measurement
65 Control line of load module 11

71 Electronic operating device of high-pressure xenon discharge lamp
72 Driver circuit for electronic operating device of high-pressure xenon discharge lamp
75 High-pressure xenon discharge lamp
81 Automobile
82 Front headlight
110 Cold lamp monitor
112 Switching controller
114 LED retrofit lamp monitor
1101 Resistor
1102 Switch
1201 Load resistor
1202 Switch

What is claimed is:

1. A headlamp for a conversion of an original headlamp of a vehicle, the headlamp having one or more light functions, the headlamp comprising:
an input for each respective light function of the one or more light functions, wherein each respective input is configured to connect to a line of an on-board network of the vehicle,
an output configured to connect to the on-board network of the vehicle,
a module for simulating an original load current for each of the one or more light functions that require significantly less power in the headlamp than a corresponding original light source in the original headlamp,
wherein each respective module comprises an electronic converter, a series circuit arrangement of a resistor and a switch, wherein the resistor is rated to a comparable order of magnitude of a resistance of the original load current to be simulated, and the series circuit is connected in parallel with the input,
one or more light sources each having an associated electronic operating device for each of the one or more light functions of the headlamp, and
a controller for controlling each respective module and for controlling the one or more light sources
wherein the module is configured, upon activation of at least one of the one or more light functions, to open the switch and turn on the electronic converter and, upon deactivation of the at least one of the one or more light functions, to close the switch and turn off the electronic converter,
wherein the one or more light sources are configured to be switched on after a specific time interval following closing of the switch.

2. The headlamp as claimed in claim 1, wherein the module comprises a circuit assembly comprising:
an input for connecting to a line of the light function,
an output for connecting to the light source which replaces the original load current, wherein the light source has a lower current consumption than the original load current,
the electronic converter, wherein an input of the electronic converter is connected in parallel with the input of the module and draws a first current from the line of the light function, wherein the first current from the line is smaller than the original load current,
wherein an output of the electronic converter feeds the first load drawn back into the on-board network of the vehicle.

3. The headlamp as claimed in claim 2 wherein the switching controller is a step-up controller.

4. The headlamp as claimed in claim 2, wherein in the event of a defect in the light source, the switching controller remains disconnected, and the switch remains open.

5. The headlamp as claimed in claim 1, wherein the load of the light function is a filament lamp.

6. The headlamp as claimed in claim 1, wherein the light source is an LED or an LED module with an associated electronic operating device for the LED or the LED module.

7. The headlamp as claimed in claim 1, wherein the light source is a HID lamp with an associated electronic operating device for the HID lamp.

8. The headlamp as claimed in claim 7, wherein the electronic operating device for the HID lamp comprises an input for the switchover between a dipped beam light function and a main beam light function connected to the controller.

9. The headlamp as claimed in claim 1, wherein the light source is an LED retrofit lamp.

10. The headlamp as claimed in claim 1 further comprising a driver circuit configured to draw a light source operating current for one or more light functions from the on-board network, and the module for simulating a load current for the relevant light function is configured to draw the rated load current for the load of the light function which is to be replaced.

11. The headlamp as claimed in claim 2, wherein the module is configured to control the electronic converter to generate the first current which is equal to the original load current of the original headlamp minus a second load current of the headlamp.

12. A circuit assembly for simulating an original load current comprising:
an input configured to connect to a line of a light function,
an output for connecting a light source which replaces the original load current, wherein the light source has a lower current consumption than the original load current,
a series circuit arrangement of a resistor and a switch, wherein the resistor is rated to a comparable order of magnitude to the resistance of the original load current, and the series circuit is connected in parallel with the input,
an electronic converter, comprising an electronic converter input connected in parallel with the input of the circuit assembly for simulating the original load current, and draws a current from the line of the light function, wherein the current from the line of the light function is smaller than the current of the original load current, wherein the circuit assembly for simulating an original load current is configured, upon the activation of the light function, to open the switch and turn on the electronic converter and, upon the deactivation of the light function, to close the switch and turn off the electronic converter,
wherein an output of electronic converter output feeds the current from the line of the light function back into an on-board network of the vehicle.

13. The circuit assembly of claim 12, wherein the electronic converter is configured to have a direct line of communication to the on-board network.

* * * * *